United States Patent

[11] 3,591,156

| [72] | Inventor | Alfred C. England<br>4170 Jaunta Way, Long Beach, Calif. 90815 |
|---|---|---|
| [21] | Appl. No | 782,986 |
| [22] | Filed | Dec. 11, 1968 |
| [45] | Patented | July 6, 1971 |

[54] FLAME CUTTING MACHINE
10 Claims, 6 Drawing Figs.

[52] U.S. Cl. .................................................. 266/23, 33/27, 77/77
[51] Int. Cl. .................................................. B23k 7/02
[50] Field of Search .................................................. 266/23; 77/77; 33/27

[56] References Cited
UNITED STATES PATENTS

| 1,582,033 | 4/1926 | Godfrey | 266/23 |
| 1,812,239 | 6/1931 | Hentschel et al. | 266/23 X |
| 2,456,444 | 12/1948 | Reid et al. | 266/23 UX |
| 2,494,532 | 1/1950 | Ager | 266/23 |
| 3,081,990 | 3/1963 | Bromley | 266/23 |
| 3,351,332 | 11/1967 | Nowell et al. | 77/77 X |
| 3,388,901 | 6/1968 | Ferguson | 33/27 X |

*Primary Examiner*—Frank T. Yost
*Attorneys*—Harvey C. Nienow and Nienow and Frater

ABSTRACT: The flame cutting machine illustration in the drawing is suitable for cutting along straight or curved lines or circles. It includes three assemblies which are mounted upon an articulated frame. A first assembly includes a torch and a pair of concentrically arranged gas conduits for supplying cutting gas to the torch. The conduits rotate on a common axis and are provided with swivel inlet fittings for gas on that same axis. These elements are mounted within a housing and a drive means is included for rotating them within the housing. The housing is mounted for movement relative to the frame in the direction of the common axis of the conduits and it is moved relatively to the frame by a motor drive drivescrew and follower nut assembly.

PATENTED JUL 6 1971 3,591,156

INVENTOR
ALFRED C. ENGLAND
BY
Nienow G Frater
ATTORNEY

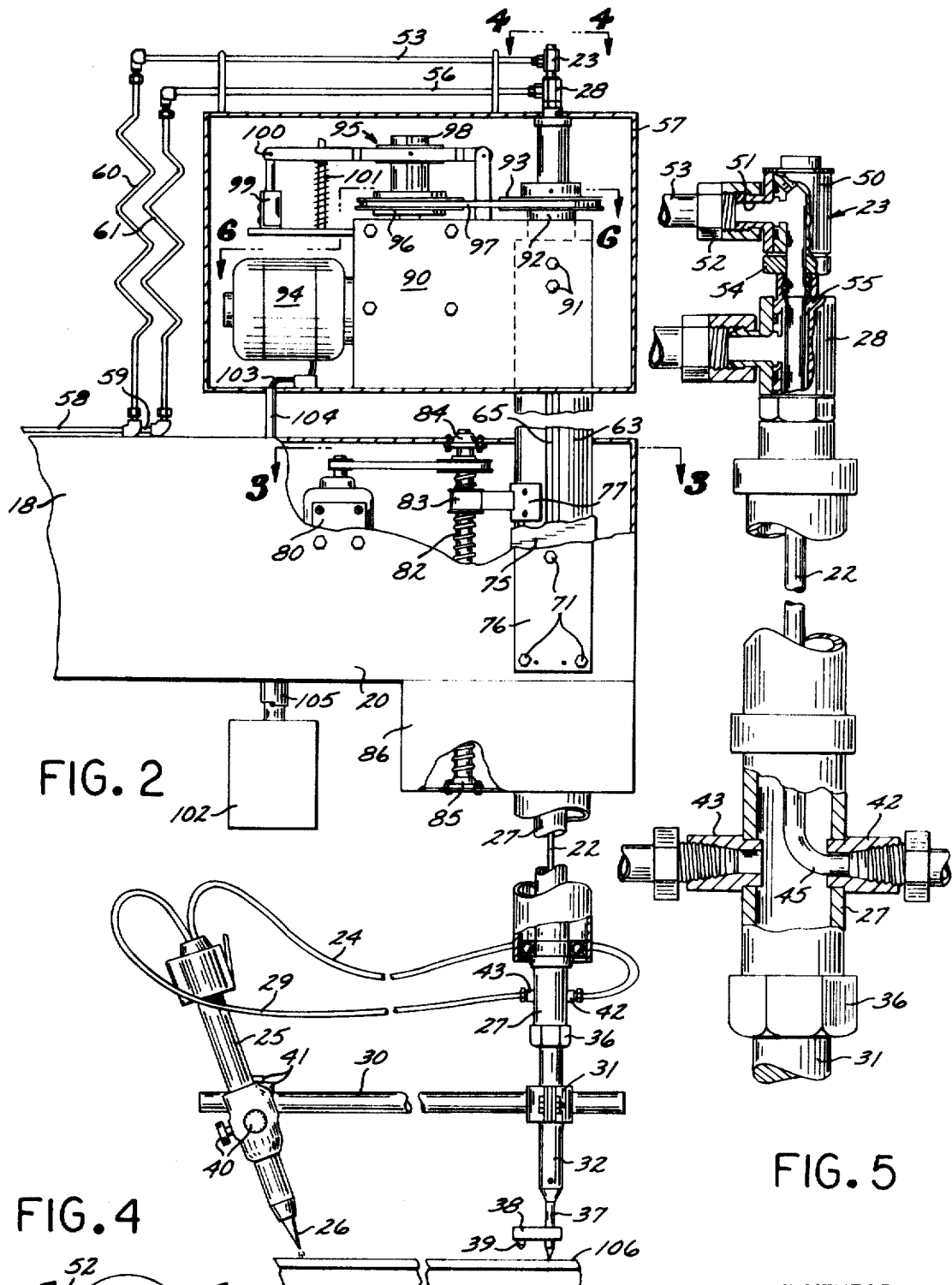
FIG. 2
FIG. 5
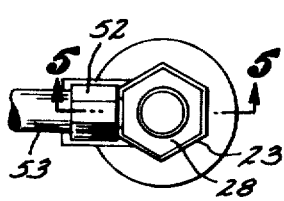
FIG. 4
INVENTOR.
ALFRED G. ENGLAND
BY
Nienow & Frater
ATTORNEY

FLAME CUTTING MACHINE

This invention relates to a machine for causing movement of a cutting torch along a predetermined path. While not limited to the cutting of circles, the invention relates to a class of machine which is particularly useful in cutting circles and is commonly called a "circle cutting machine." An object of the invention is to provide improvements for circle cutting machines which will enhance their utility in cutting various shapes including circles. Nonetheless, it is another object of the invention to provide improvements in flame cutting machines which are arranged to cut only circles.

Flame-cutting machines employ gases of different kinds as fuels to form a very hot and high velocity jet of burning gas which is capable of cutting through metals. Larger sized machines are capable of cutting through many inches of steel, and other materials, along very long paths such, for example, as the perimeter of very large circles. The quantity of gas required to accomplish this extensive cutting is too great to be contained in vessels which are made portable with the cutting torch. This factor complicates the task of accomplishing the required relative movement between the torch and the workpiece to be cut. One solution is to move the workpiece with respect to a stationary torch and gas supply. An alternative solution is to move the torch relative to a stationary workpiece and relative to a gas supply which is stationary or at least less movable than the torch.

Prior art circle cutting machines which move the cutting torch with respect to a stationary workpiece supply have resulted in an unwieldy arrangement for delivering the gas from the supply to the torch. The awkwardness of the gas delivery structures has increased in proportion to the degree in which the cutting torch motion mechanism has been made more flexible. It is an object of this invention to provide a circle cutting machine which overcomes this difficulty by providing an improved structure for communicating gas from the supply to the cutting torch without restricting the flexibility or degree of movement of the cutting torch relative to the work. It is, in fact, an object of the invention to provide a structure in which the gas communication and torch movement functions are combined in a way to avoid any material limitation on torch movement.

Prior art devices employ flexible hoses for supplying gas to the torch, the hoses being sufficiently flexible to enable full freedom of movement of a torch connected at one end of the hoses relative to a point to which the other end of the hoses are fixed. This arrangement presents difficulty because the hoses have fixed length whereas the distance between the torch and the inlet end of the supply hoses may vary greatly from time to time as for example when successive circles are cut one on a large and another on a small diameter. To overcome this problem, the prior art devices sometimes include structures designed to hold the flexible supply hoses out of the way where they would not interfere with the cutting work. The arrangement sometimes has precluded cutting a circle by making a continuous cut in one rotational direction and have required the employment of such expedients as repositioning the work or cutting part of a circle in the clockwise direction and then cutting the remainder in the counterclockwise direction.

It is an object of the invention to overcome all of these difficulties and to overcome them by provision of a structure which is relatively inexpensive to produce, is reliable in its operation and is relatively easy to service and maintain.

While the invention may be defined in various ways and by different numbers and combinations of the elements and features which characterize it, it may be summarized that certain of the foregoing objects and advantages of the invention and others that will hereinafter appear are realized in part by the provision in the invention of an assembly including a conduit for gas rotatable about an axis extending through the conduit at least at one point along its length and by the provision of an inlet gas fitting interconnecting and communicating with the conduit at that point and being rotatable relatively to the conduit on that axis, and including a torch mounted for rotation with the conduit and formed with a flow path communicating with the conduit; by the provision of means for selectively translating those elements in the direction of that axis; and by the provision of means for rotating said assembly in any translational position.

These and other features of the invention are incorporated in the embodiment which is now considered to be the best mode for practicing the invention and which has been selected for illustration in the accompanying drawings.

In the drawings:

FIG. 2 is a view in side elevation of the outer end of the machine of FIG. 1 including the cutting torch and the structures by which it is made to move and by which gas is supplied to the torch, certain portions of this structure being broken away and others being shown in cross section and by phantom lines;

FIG. 4 is a top plan view of a gas inlet swivel assembly employed in the machine and as seen when viewed from line 4–4 of FIG. 2;

FIG. 5 is a view in side elevation of a portion of the gas conduit and inlet fitting structure part of which has been broken away for the sake of clarity and part of which has been sectioned on line 5–5 of FIG. 4 to show internal construction.

Figure 1:
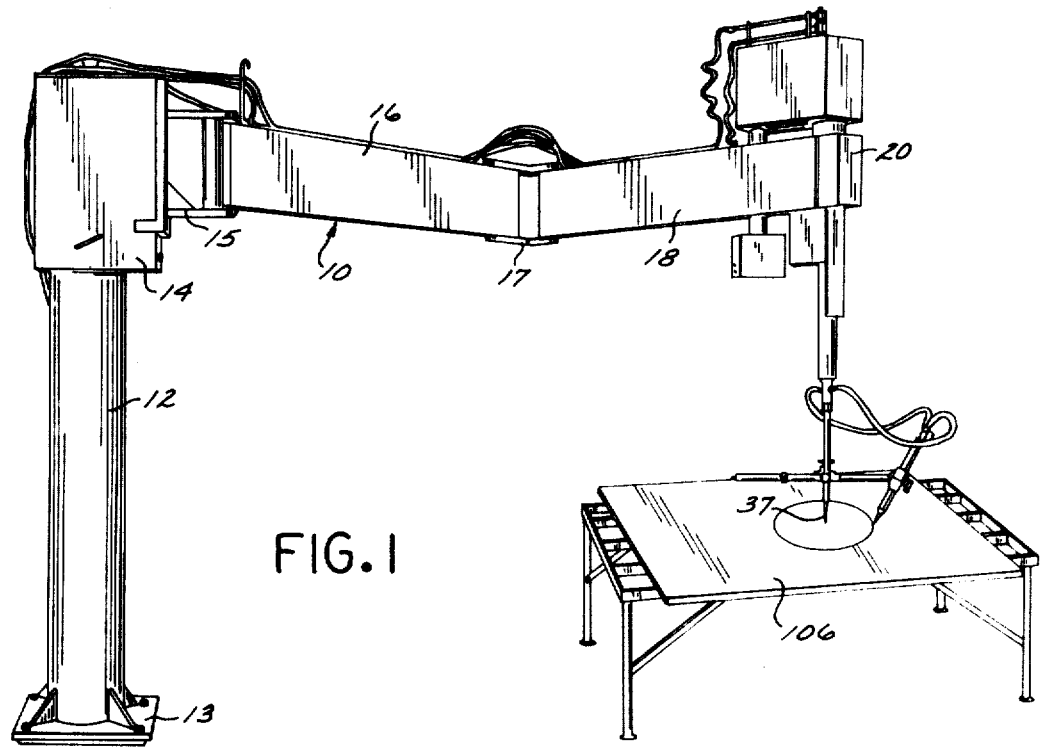
FIG. 1 is an isometric view of a circle cutting machine embodying the invention shown together with a plate of work material from which a circle is to be cut.

Referring to FIG. 1 of the drawings, the circle cutting machine there shown is generally designated by the reference numeral 10. It comprises a stanchion 12 terminating at its lower end in a mounting plate 13 by which the machine is bolted to a base or to the work floor. A housing 14 is built over the upper end of the stanchion 12 and serves as a container for electrical connections and protective circuitry and other functions unrelated to the invention. The standing part of a hinge structure 15 extends laterally from the housing 14. The remaining part of that hinge structure is carried at the inboard end of a laterally extending arm 16. Advantageously as shown, the arm 16 is permitted rotational movement about its hinge connection with the stanchion 12 through an arc which is substantially greater than 180°. At its outboard end the arm 16 has a hinge connection through a double hinge structure 17 to the inboard end of a second arm 18 whereby pivotal movement of the arm 18 relative to the arm 16 is permitted through an arc approaching 360°.

The torch and gas feed assembly and the apparatus for rotating this assembly and for moving it up and down, in FIG. 1, are all mounted at the outboard end of the arm 18. In its broadest sense the invention does not depend upon the use of an articulated frame structure such, for example, as the frame illustrated here and which comprises the stanchion 12, the arms 16 and 18 and the hinges which interconnect them. Instead, the remainder of the apparatus is entirely capable and effective to cut circles, even without the articulation of its frame. Nonetheless, the utility of the torch motion and gas feed portions of the machine is greatly enhanced by such articulation which makes flame cutting on straight lines and on curved line other than circles very practical and convenient. The structure at the outboard end of the arm 18 is capable of rotating the torch upon an axis and translating the torch along that axis or in a direction parallel to the axis. The articulated frame structure enables translational movement in the other two dimensions.

The machine of FIG. 1 is arranged for mounting on a horizontal surface and for cutting circles from workpieces that lie in a horizontal plane. The axis of torch rotation is vertical and the translational movement of the torch, by the movement mechanism at the outboard end of arm 18, is in the vertical direction along the axis of torch rotation. It will be apparent that this particular orientation need not be preserved. For example, the torch could be mounted for rotation about a horizontal axis and mounted for translational movement along that axis. To facilitate understanding of the invention, torch movement and orientation will be described as rotation about a vertical axis and movable in a vertical axis and translatable horizontally by pivotal movement of the frame arms 16 and 18 left and right with respect to the showing of FIG. 1. But, it is to be understood that this terminology is employed only to facilitate understanding and that the invention is not limited to such orientation or directions.

Returning to FIG. 2 of the drawings, the structure there shown is mounted at the outboard end 20 of the arm 18. The structure can be considered to comprise three assemblies, the first of which includes a conduit for gas which is rotatable about an axis extending through the conduit, an inlet gas fitting which communicates with the conduit at that point and which is rotatable relative to the conduit on that rotational axis, and a gas torch mounted for rotation with the conduit and formed with a flow path that communicates with the conduit. In the form selected for illustration in the drawing, the conduit for gas is a long straight tube 22 which connects at its uppermost end to a swivel inlet fitting 23 and which has connection at its lower end to a flexible conduit section 24 which transports gas from the conduit 22 to a flow path within the torch 25 by which it flows to a point of emergence at the tip 26 of the torch. Generally, the high heats required at the torch output are generated in a reaction which combines two gases making it necessary to introduce two gases to the torch. The embodiment illustrated provides a means for transporting two gases to the torch which includes, in addition to the conduit 22, a second conduit 27 which surrounds and is concentric with the conduit 22 so that the two have a common axis about which they may be rotated together. Gas is introduced into the conduit 27 by a second swivel fitting 28 which is mounted on the conduit 27 on its axis. Gas flowing down the conduit 27 proceeds through a fitting in the conduit wall to a length of flexible tubing or hose 29 by which it is introduced into a second flow path within the nozzle 25 to emerge with the gas introduced by hose 24 at the nozzle 26. There is an extension bar extending laterally from the concentric conduits so that the extension bar rotates with the conduits. The torch is mounted on that extension bar, or a corresponding structure, so that it is positioned laterally from the axis of rotation at a distance which corresponds to the radius of the circle to be cut. In the embodiment selected for illustration in the drawings, a lateral extension bar 30 is shown. It is connected not directly to the concentric conduits but is connected by a clamp 31 to a rod 32 which extends downwardly from the lower end of conduit 27. It is secured to that lower end of the conduit by a fastening member 36 so that the rod 32 is in axial alignment with the concentric conduits. In this embodiment a pin 37 extends downwardly from the rod 32 on the same axis to form a locater to assure alignment of the axis of torch rotation with the center of the circle to be cut. Advantageously, as in this embodiment, the pin 37 is rotatable relatively to the rod 32 and the remainder of the assembly whereby to assist in maintaining the pin 37 in proper position on the workpiece. It is provided with a lateral extension 38 which is provided with a second downwardly extending pin 39 which can be lowered together with the bar 38 to the surface of the workpiece so that bearing against the workpiece assists in stabilizing the connection between the center pin 37 and the workpiece. The torch 25 includes valves for adjusting the flow rate of the gases from the nozzle 26 and these valves are controlled by their operating handles 40. The orientation of the torch 25 may be controlled in the rotational direction about the axis of extension bar 30 and about a perpendicular axis which permits adjustment of the angle that the flame line makes with the axis of rotation. The structure by which this orientation is adjusted and fixed is visible in FIG. 2 where it is designated by the reference numeral 41.

The relationship of the concentric conduits one to the other and the relationship between them and their inlet fittings and the arrangement of the outlets from those conduits are best seen in FIG. 5. At diametric points of the conduit 27 near its lower end the conduit is perforated and in the perforations are disposed the inner end of a pair of couplings 42 and 43. The inner end of these couplings are connected by any suitable means as by being brazed as shown, to the conduit 27. At their outlet ends these couplings 42 and 43 are threaded to accommodate fittings at the inlet ends of the two hoses 24 and 29 which supply gas to the torch. The lower end 45 of the inner conduit 22 is turned laterally so that its end fits within the inlet end of the coupling 42 where it is fastened, as by being brazed, to create a gastight seal. Thus, the gas that proceeds down conduit 27 emerges therefrom by coupling 43 and the gas which proceeds down conduit 22 emerges therefrom and from the conduit 27 via the coupling 42.

At their corresponding upper ends the two conduits 22 and 27 are connected to the swivel inlet fittings 23 and 28, respectively. A variety of suitable fittings are available. The fittings illustrated in the drawings are a type commonly used in conducting hydraulic fluid and compressed air around the pivotal connections between elements of machine tools such as earth moving apparatus. The inlet fitting 23 comprises an outer cylindrical casing 50 formed with and integral lateral stem 51 which forms part of a swivel nut 52 by which the fitting is connected to an inlet gas tube 53. A sleeve 54 is rotatably mounted within the casing. It is provided with an axial bore partway through its length which terminates at a lateral passage which communicated with an annular groove formed around the periphery of the sleeve midway along its length. Gas entering at the swivel nut flows through the bore of the stem 51 to the annular groove surrounding from whence it flows through the lateral passage to the axial bore of the sleeve. At its lower end, the sleeve is connected to the upper end of conduit 22. The inlet fitting 28 is constructed in the same fashion with the exception that its dimensions are somewhat greater than the dimensions of the fitting 23 and the further exception that the inner sleeve 55 of this fitting is bored entirely through to accommodate conduit 22 which extends through fitting 28 to its connection with fitting 23. The two sleeves 54 and 55 rotate with the conduits 22 and 27 relative to the casings of the two fittings which are fixed, or are substantially fixed, relative to the frame 18. Because they rotate with the tube 22 it is possible to preclude the leakage of gas from one conduit to the other by brazing, or otherwise connecting, the conduit 22 to the two-swivel nut sleeves.

Gas is introduced to the fitting 28 by an inlet hose or tube 56 which is mounted upon a housing member 57 which encloses and provides a support for the means for rotating the concentric conduits on the torch. In operation the housing 57 is moved toward and away from the end 20 of the beam or frame 18. To permit this movement a length of coiled, extension conduit is interposed between flow lines 53 and 56, carried by housing 57, and flow lines 58 and 59 carried by the frame 18. These extension hoses are designated by the reference numerals 60 and 61 in FIG. 2.

Figure 3:
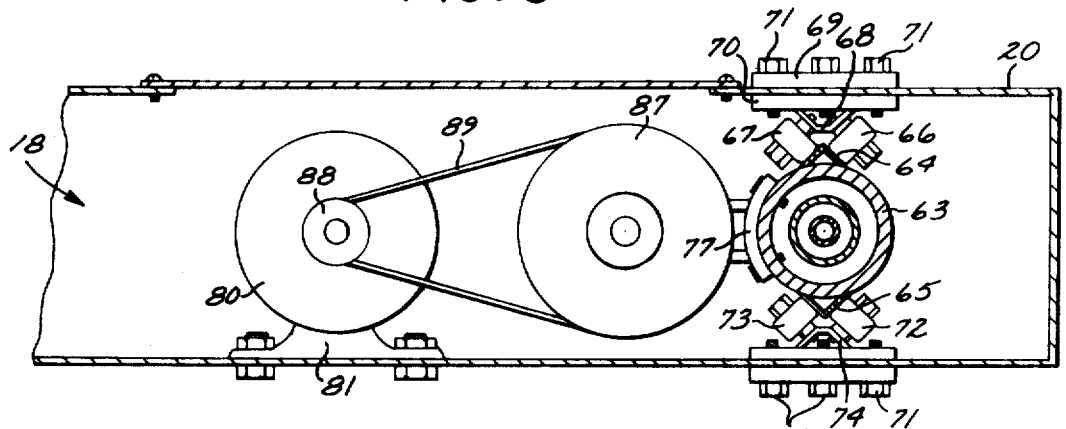
FIG. 3 is a cross-sectional view, taken on line 3–3 of FIG. 2, illustrating the structures by which the torch and gas feed assembly is moved relative to the machine frame.

In addition to the means for rotating the two conduits, which will be described below, means are provided for translating the conduits and the torch in the direction of the rotational axis of the conduits. Advantageously, this means comprises a housing within which the conduits are mounted for rotation and which extends along their length. The conduits are mounted so that, while rotation is permitted, significant relative motion in a direction of the rotational axis relative to the housing is precluded. The housing itself is mounted for translational movement relative to the frame so that it will carry the conduits and the torch assembly up and down as the housing is moved relative to the frame. In the embodiment selected for illustration, this movable member or housing has the form of a cylinder or pipe which is arranged concentrically with the conduits 22 and 27. This may be seen in FIGS. 3 and 6. FIG. 3, which is drawn in slightly larger scale than is FIG. 6, also illustrates the preferred mounting structure for the cylindrical pipe or housing member 63. The mounting structure for this member is arranged so that its translation along its axis is permitted but so that its rotation is precluded. To this end, a track and roller structure is provided and is interposed between the member 63 and the frame 18 at the outboard end 20 of the frame. This track and roller construction includes a track which is secured to one of the member or frame and a roller set which is secured to the other. In the embodiment selected for illustration, and advantageously so, the track is V-shaped and is mounted on one of the member or frame such that the bottom of the V faces toward the other of the member or frame. In FIG. 3, two sets of tracks and rollers are employed. The tracks are secured as by welding, or any other convenient means, lengthwise of the member 63 on opposite sides. One V-track is designated by the numeral 64 and the other is designated by the numeral 65. The tracks 64 and 65 move over two sets of rollers. The two sets are similar. One set is located near the upper side of the frame 18 and the other set is mounted at the lower side of the frame 18. It is the upper set that is visible in FIG. 3 and it comprises two pairs of rollers, one associated with and straddling the track 64 and the other associated with and straddling the track 65. The rollers which are associated with and which will roll over the surface of the two arms of the V-shaped track 64 are designated by the numeral 66 and 67. They are mounted for rotation on an axle which is secured to a V or U-shaped bracket 68 the open end of which is secured, as by welding or other convenient means, to a plate which is bolted to one side of the frame end 20. This structure is strengthened and stiffened by the addition of a second plate 69 so that the frame wall is clamped between the two plates 69 and 70 by a number of bolts which are collectively designated by the numeral 71. Rollers 72 and 73 are mounted on axles fixed to a U-bracket 74 which is secured to a plate 75. A stiffening plate 76 is placed on the exterior of the frame and more bolts 71 extend through the plate 76 to a threaded connection in the interior plate 75 so that these two plates are clamped to the wall of the frame which lies sandwichlike between them. The result is a track and roller structure which is readily manufactured with inexpensive tooling but which permits longitudinal translation while precluding rotation.

A yoke like bracket 77 is bolted to the right wall, in FIG. 3, of the member 63. This yoke 77 is seen from the side in FIG. 2. It serves as a handle by which force is applied to raise and lower the member 63 and the structures mounted upon it. Means are provided in the invention for applying a force between the members 63 and the frame for moving the member 63 up and down within the latter. Advantageously, this means comprises a traveling nut and lead screw assembly which is motor powered. Such a structure is employed in the embodiment illustrated. A drive motor 80 is mounted by a bracket and bolt set 81 to one wall of the frame 18 so that its output shaft is parallel with the axis of the member 63. A lead screw 82 and a traveling nut 83 are provided and threaded one with the other. One of these elements is mounted upon the frame and the other is mounted upon the member 63. In the embodiment shown, the traveling nut 83 is mounted at the end of the yoke bracket 77 and the lead screw 82 is mounted for rotation in bearings 84 in the upper wall of frame 18 and 85 in a lower extension 86 of the forward end 20 of frame 18. In this embodiment a pulley 87 (see FIG. 3) is fixed to the lead screw 82 so that rotation of the pulley results in rotation of the lead screw. Motor output rotates a pulley 88 and the two pulleys, 87 and 88, are interconnected by a drive belt 89 which results in rotation of the lead screw when the motor 80 is energized to rotate its output shaft and the pulley 88. Member 63 and its yoke bracket 77 are precluded from rotation by the track and roller assemblies whereby rotation of lead screw 82 within the traveling 83 applies a force to the nut and to the yoke bracket which results in motion up or down of the member 63 depending upon the rotational direction of the output shaft motor 80 which is a reversible electrically powered motor.

Figure 6:
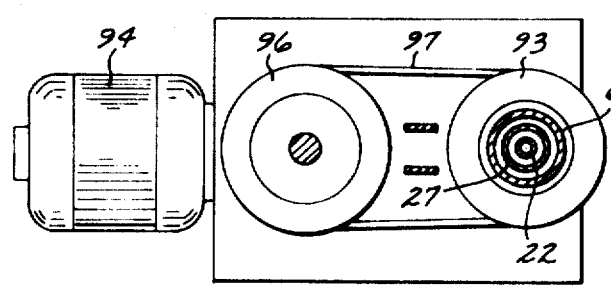
FIG. 6 is a cross-sectional view, taken on line 6–6 of FIG. 2 of portions of the mechanism by which the torch and gas feed structure are rotated.

The means for rotating the concentric conduits 22 and 27 within the housing member 63 comprises an assembly which is contained within the housing or cabinet 57. This assembly comprises a mounting plate 90 which is bolted by bolts 91 to the upper end of the housing member 63. The plate 90 moves up and down with member 63 and it is precluded from rotation relative to frame 18 because the member 63 is precluded from such rotation by the construction of the track and roller assembly. The concentric conduit 27 extends upwardly above the upper end of the housing member 63 and a sleeve 92 which carries a pulley 93 is slipped over and is fixed to the conduit 27. Rotation of the pulley 93 results in rotation of the conduit 27 and of the inner conduit 22, relative to the housing member 63. The assembly includes a gear motor 94 and a clutch, generally designated 95, by which the rotational output of the gear motor is utilized to rotate the pulley 93. Portions of the gear motor 94, which are not visible in FIG. 2 because they lie behind the plate 90, provide a shaft rotation about an axis coincident with the axis of pulley 96. That rotation is coupled to the pulley 98 so that pulley 96 will drive the pulley 93 through belt 97 when the sleeve 98 is lowered, in FIG. 2, by energizing the solenoid 99 drawing the right end of yoke 100 downwardly against the bias of release spring 101. The arrangement of the two pulleys 93 and 96, and that they are interconnected by the belt 97, is best shown in FIG. 6.

Electrical power for the drive motor 94 and the motor 80 is controlled by switches housed in a control box 102 extending below the underside of the frame 18. The control box is mounted upon a shaft which extends upwardly to the housing or cabinet 57 carried by the housing member 63. The energizing wires 103 for motor 94 are visible in FIG. 2 at the point at which they emerge from the shaft 104 of the control box 102. The shaft 104 is disposed within and is guided by a guide flange 105 mounted upon the frame 18.

In operation of the unit, assuming that the machine is to be used to cut a circle, the centering pin 37 is aligned over the center of the circle to be cut in a workpiece, such as workpiece 106 shown in FIG. 1, by moving the arms 16 and 18 of the frame. The pin 37 having been aligned over the circle center, it is lowered into engagement with the workpiece 106 by proper switching at the control box 102 to energize motor 80 to rotate the lead screw 82 in a direction making the follower nut move downwardly. The housing member 63 is carried downwardly with the traveling nut until the pin 37 rests against the workpiece 106. At this point the motor 80 is deenergized to stop downward motion of the member 63. The position of torch 25 is then adjusted. Its height above the workpiece is adjusted by adjusting the position of clamp 31 on the downwardly extending rod 32. The radius at which the torch will cut and the bevel at which the edge of the circle formed will be cut is determined by adjusting the position of the torch on extension rod 30 and its angle with extension 30 at the adjustment member and clamp 41. Fuel for the torch is supplied from a stationary source through the supply lines 58, 59 and the flexible lines 60 and 61 and thereafter the conduits 53 and 56 to the concentric conduits 22 and 27. From these conduits the gas is supplied to the torch by the flexible hoses 24 and 29. The flow rate of gas is adjusted by the valves 40 so that the gas emerges in proper quantity and proportion at the nozzle 26. These gases are ignited when cutting is to commence. An initial opening having been burned through the workpiece, rotation of the torch is commenced by actuation of the switches in control unit 102 to energize motor 94 and to engage the clutch 95 by energizing solenoid 99. Progress of the torch can be interrupted at any time by deenergizing the solenoid 99 so that the clutch is disengaged by the action of the spring 101.

Although I have shown and described certain specific embodiments of my invention, I am fully aware that many modifications thereof are possible. My invention therefore is not to

I claim:

1. An improved flame-cutting machine comprising in combination:
   a frame;
   a first assembly including a conduit for gas rotatable about an axis extending through said conduit at at least one point along its length, an inlet gas fitting interconnecting with and communicating the conduit at said point and being rotatable relative to said conduit on said axis and a gas torch mounted for rotation with said conduit and formed with a flow path communicating with said conduit;
   a second assembly comprising means for selectively translating said first assembly in the direction of said axis;
   a third assembly including means for selectively rotating said first assembly in any translational position of said first assembly;
   said second assembly comprising a pair of track and roller structures interposed between said frame and said member, the track of each pair being carried by one of said frame or member and the roller of each pair being carried by the other of said track or member;
   said second assembly further comprising a drivescrew and traveling nut assembly, one of said drivescrew and nut being connected to said frame and the other of said drivescrew or nut being connected to said member; and
   selectively operable power means for rotating the traveling nut relative to said screw.

2. The invention defined in claim 1, in which said member of said second assembly comprises a housing in which said conduit is mounted;
   and in which said track and roller assemblies comprise a pair of elongate V-shaped tracks mounted upon one of said frame or housing with the bottom of the V extending toward the other, and in which said rollers comprise a pair associated with each of said tracks, each roller of a pair being mounted in engagement with a respectively associated arm of one V-shaped track and mounted to roll along its respectively associated arm when the track is moved relative to the roller in the direction of said axis about which said conduit for gas is rotatable.

3. An improved flame-cutting machine comprising in combination:
   a frame;
   a first assembly including a conduit for gas rotatable about an axis extending through said conduit at at least one point along its length, an inlet gas fitting interconnecting with and communicating with the conduit at said point and being rotatable relative to said conduit on said axis, and a gas torch mounted for rotation with said conduit and formed with a flow path communicating with said conduit;
   a second assembly comprising means for selectively translating said first assembly in the direction of said axis and including an elongate housing mounted for translational movement along said axis extending through said conduit and relative to said frame; and
   a third assembly including means for selectively rotating said first assembly in any translational position of said first assembly;
   said conduit comprising a tubular member extending along said axis through said housing, and said first assembly further comprising a second conduit mounted concentrically within said first conduit and on its axis, a second inlet gas fitting interconnecting with said second conduit and rotatable relative thereto on said axis, and said torch being formed with a second flow path communicating with said second conduit.

4. The invention defined in claim 3, in which said third assembly comprises motor means carried by said housing for providing output motion capable of rotating said conduit and said second conduit, and means including a clutch for operatively connecting the output of said motor means with said conduit and said second conduit.

5. The invention defined in claim 4, in which said second inlet gas fitting interconnects with the second conduit at said axis and is rotatable relative to said conduits, said conduit first-mentioned extending through said second inlet fitting to connection with said inlet fitting first-mentioned and the inlet fitting first-mentioned and said second fitting being interconnected to preclude relative motion between them as an incident to rotational movement of said conduits.

6. For a flame cutting machine, a cutting torch and gas feed assembly comprising:
   first and second gas flow conduits concentrically mounted, one within the other, for rotation about their common axis, a torch formed with a pair of gas flow paths adapted to receive gas from said conduits, a pair of flexible conduits, each connecting one of the flow paths of said torch with one of said conduits at a corresponding end of said conduits, (and) a pair of inlet gas fittings, one having a swivel connection with said one conduit and the other having swivel connection with said other conduit at the other corresponding ends of said conduits, a frame, a means interposed between said frame and said assembly comprising a pair of track and roller structures permitting movement of said assembly on said frame and motive power means including a drivescrew and traveling nut thereon to so move said assembly.

7. The invention defined in claim 6 which further comprises an elongate housing containing said conduits and within which said conduits are rotatable, and motive power means selectively operable for rotating said conduits.

8. The invention defined in claim 7, in which said motive power means comprises an electrically energized motor, a pair of pulleys one driven by the motor and the other connected to said conduits, a belt interconnecting said pulleys, and clutch means for engaging and disengaging the connection between said drive motor and said belt.

9. The invention defined in claim 7 which further comprises a frame and means for translating said housing relative to said frame in the direction of said common axis of the conduits.

10. The invention defined in claim 9, in which said means for translating said housing relative to said frame further comprises a lead screw and traveling nut assembly, one of the lead screw and nut being connected to said housing and the other of said lead screw and nut assembly being connected to said frame.